United States Patent [19]

Ueno et al.

[11] Patent Number: 4,988,035
[45] Date of Patent: Jan. 29, 1991

[54] METHOD OF LIQUID PHASE DIFFUSION BONDING OF METAL BODIES

[75] Inventors: Yasuhiro Ueno; Hiroshi Kagechika; Itaru Watanabe; Shigeyoshi Kosuge; Toshifumi Kojima, all of Tokyo, Japan

[73] Assignee: Nippon Kokan Kabushiki Kaisha, Tokyo, Japan

[21] Appl. No.: 403,789

[22] Filed: Sep. 5, 1989

Related U.S. Application Data

[60] Division of Ser. No. 246,909, Sep. 16, 1988, abandoned, which is a continuation of Ser. No. 12,090, Feb. 9, 1987, abandoned.

[51] Int. Cl.$^5$ .............................................. B23K 20/02
[52] U.S. Cl. .................................... 228/175; 228/190; 228/194
[58] Field of Search ............... 228/175, 190, 193, 194

[56] References Cited

U.S. PATENT DOCUMENTS

| 3,678,570 | 7/1972 | Paulonis et al. | 228/194 |
| 3,859,144 | 1/1975 | Basche et al. | 228/194 X |
| 3,981,429 | 9/1976 | Parker | 228/194 |
| 4,029,479 | 6/1977 | Parker | 428/674 X |
| 4,034,906 | 7/1977 | Carlson et al. | 228/194 |
| 4,059,217 | 11/1977 | Woodward | 228/194 X |
| 4,122,992 | 10/1978 | Duvall et al. | 228/194 X |
| 4,336,292 | 6/1982 | Blair | 228/175 X |
| 4,340,650 | 7/1982 | Pattanaik et al. | 428/675 |
| 4,562,121 | 12/1985 | Thiemann et al. | 228/56.3 X |
| 4,674,675 | 6/1987 | Mietrach | 228/194 |
| 4,691,856 | 9/1987 | Haramaki et al. | 228/194 |
| 4,705,207 | 11/1987 | Norris | 228/194 |
| 4,715,525 | 12/1987 | Norris | 228/194 |

FOREIGN PATENT DOCUMENTS 0038584 10/1981 European Pat. Off.
2147512 3/1973 France.

Primary Examiner—Kenneth J. Ramsey
Attorney, Agent, or Firm—Frishauf, Holtz, Goodman & Woodward

[57] ABSTRACT

Insert 1 comprises thin substrate made by cold-rolling, and two bonding alloy layers formed by plating on the upper and lower surfaces of substrate, respectively. Both layers is extremely thin, and is made of an alloy having a melting point lower than that of substrate. Insert 1 is used to achieve liquid phase diffusion bonding of first and second base metals. Insert 1 is interposed between first base metal and second base metal. Then, insert 1 and base metals are clamped together with a pressure of, for example, 0.5 kgf/mm$^2$, and are placed in a atmosphere of a low pressure of about $10^{-4}$ Torr and heated to the melting point of alloy layers or to a temperature above this melting point but below the melting points of substrate and plates.

12 Claims, 2 Drawing Sheets

METHOD OF LIQUID PHASE DIFFUSION BONDING OF METAL BODIES

This application is a Division, of application Ser. No. 07/246,909, filed Sep. 16, 1988, now abandoned, which was a continuation of application Ser. No. 07/012,090, filed Feb. 19, 1987, abandoned.

BACKGROUND OF THE INVENTION

The present invention relates to an insert which is to be interposed between two base metal bodies for achieving liquid phase diffusion bonding of these base metal bodies.

In order to join, the base metal bodies of such materials as high-alloy which are difficult to apply fusion-weld techniques, or in order to join bodies of base metals which have large joining interface, the method called "diffusion bonding" is employed. This method consists in first holding two base metal bodies to be bonded together by proper means and then heating them in vacuum or an inert-gas atmosphere, thereby diffusing metal body atoms from one base metal into the other, or from an insert to one or both base metal bodies, and thus bonding the base metal bodies together without melting the base metals. Various methods of diffusion bondings are known. They are classified into three types, direct diffusion bonding, solid phase diffusion bonding, and liquid phase diffusion bonding.

In direct diffusion bonding, two base metal bodies are held in face-to-face contact. In solid phase diffusion bonding, an insert is interposed between two base metal bodies and metal atoms diffuse from the insert into the base metals without melting the insert. In liquid phase diffusion bonding, an insert is interposed between two base metals and is melted, whereby metal atoms diffuse from the insert into the base metal bodies. Liquid phase diffusion bonding is advantageous over the other two diffusion bonding methods in that a lower pressure is required to hold the base metal bodies and/or the insert together.

The insert used in the liquid phase diffusion bonding is made of a metal or an alloy having a melting point lower than that of the base metal bodies. The assembly consisting of the base metal bodies and the insert interposed between the base metals is heated in vacuum or an inertgas atmosphere to the melting point of the insert or a higher temperature, thereby melting the insert. As the insert melts, the metal atoms diffuse from the insert into the base metal bodies, whereby the base metal bodies are bonded. (See U.S. Pat. No. 3,678,570 to Paulonis et al.) It is desirable that the insert be thin enough, 5 to 200 $\mu$m, to allow the metal atoms to diffuse easily into the base metal bodies. Two types of such thin inserts are available. The first type is a film made of powder of insert material or a foil of insert material. The second is an insert made of one or two layers of insert material formed on the joining surfaces of the base metal bodies, respectively, either by plating or by spraying.

When the insert used in the liquid phase diffusion bonding is a film made of powder of insert material or consists of one or two layers of insert material formed on the base metal bodies by spraying, respectively, an oxide is likely to be formed on the joining surfaces of the base metal bodies. Further, since it is difficult to make such an insert have a uniform thickness, some portions of the insert will remain on the joining surfaces of the base metal bodies after the base metal bodies have been heated. For these reasons, the bonding strength attained is insufficient. On the other hand, the insert, which consists of one or two layers of insert material plated on the base metal bodies, can have a uniform thickness if the base metal bodies have simple shapes. If these base metals are large, or have complicated shapes, the insert can hardly have a uniform thickness.

On the other hand, it is relatively easy to form a foil of insert material, having a uniform thickness. This foil can therefore provide an insert layer having a uniform thickness for large joining surfaces. The foil can be made either by rolling or by rapid solidification process. One of the alloys that can be rolled into a foil having 5 to 200 $\mu$m is Al-13% Si alloy. This alloy is usually used in component of a so-called brazing sheet. The brazing sheet is made first by sandwiching a thin aluminum plate between two thin plates of Al-13% Si alloy and then by rolling all these plates together. As is disclosed in Japanese Patent Disclosure No. 119683 (1981) KOKAI, the brazing sheet is interposed between a Ti plate and an Al plate, or between two Al plates, thus to join these plates by liquid phase diffusion bonding.

To fasten two base metal bodies of Ni-based alloy by liquid phase diffusion bonding, an insert made of a Ni-based alloy containing P, B or Si which lowers the melting point of the Ni-based alloy, is often used. This alloy and the other low melting-point alloys forming inserts for liquid phase diffusion bonding can hardly be rolled into foils having a thickness of 5 to 200 $\mu$m. This is because all these alloys have a small workability and the foils made by hot-rolling these metals are apt to have cracks. Indeed a rapid solidification process can provide thin foils made of these alloys and having a thickness of 5 to 200 $\mu$m, but cannot provide thin foils having a size of 1 m (length)$\times$0.5 m (wide) or a wider size. Most of the low melting-point alloys, generally used as the materials of inserts for liquid phase diffusion bonding, are brittle. A thin foil made of any of these alloys and interposed between two base metals will be apt to be torn when the base metals slide against each other. In some cases, the thin foil can be torn while it is inserted into the gap between the base metals.

SUMMARY OF THE INVENTION

Accordingly, the object of the present invention is to provide an insert for liquid phase diffusion bonding, which can bond base metal bodies, even if the base metal bodies are large and/or have a complicated shape, and which is easy to manufacture and to handle.

An insert according to one aspect of the invention is to be inserted between a first base metal bodies and a second base metal body, both made of a metal or an alloy, to join the first and second base metal bodies by liquid phase diffusion bonding. This insert comprises a thin substrate and two bonding alloy layers plated on both surfaces of the substrate, respectively. The substrate is made of a material selected from the group consisting of Fe, Ni, Cu, Ti, a Fe-based alloy, a Ni-based alloy, a Cu-based alloy and a Ti-based alloy. Either bonding alloy layer has a melting point lower than that of the materials of the first and second base metal bodies. When the insert is interposed between the first and second base metal bodies, and the insert and both base metal bodies are then heated to the melting point of the alloy layers or to a higher temperature, the atoms of the alloy layers diffuse into the first and second base metal bodies, and also into the substrate, whereby the substrate joins these base metal bodies.

An insert according to another aspect of the invention is to be inserted between a first base metal body and a second base metal body, both made of a metal or an alloy, to join the first and second base metal bodies by a combination of solid diffusion and liquid phase diffusion bonding. This insert comprises a thin substrate and one bonding alloy layer plated on one surface of the substrate. The substrate is of the same material as that of the first base metal body or a material containing the material of the main element of the first base metal body. This material is selected from the group consisting of Fe, Ni, Cu, Ti, a Fe-based alloy, a Ni-based alloy, a Cu-based alloy and a Ti-based alloy. The bonding alloy layer has a melting point lower than that of the substrate and that of the material of the first and second base metal bodies. The insert is interposed between the first and second base metal bodies with the bonding alloy layer contacting the second base metal body, and the insert and both base metal bodies are then gradually heated. When the bonding alloy layer is heated to its melting point or a higher temperature, its atoms diffuse into the second base metal body. At the same time the bonding alloy layer is heated, the substrate is joined to the first base metal by direct diffusion bonding. As a result, the insert joins the first and second bodies by liquid phase diffusion bonding between the insert material and the second body.

As has been described, in either insert of the invention, the bonding alloy layer or layers are plated on the substrate made of a material selected from the group consisting of Fe, Ni, Cu, Ti, a Fe-based alloy, a Ni-based alloy, a Cu-based alloy and a Ti-based alloy. The alloy layers can, therefore, have a uniform thickness even if the first and second bodies are large and/or have a complicated shape uneven. It follows that these alloy layers can strongly and firmly join the base metal bodies together. Since the substrate is made of a mechanically strong material, the insert is easy to manufacture and handle. Further, since the bonding alloy layers are formed by plating, they can be extremely thin. Hence, they can be heated to their melting point or a higher temperature in a short period of time.

DETAILED DESCRIPTION OF THE PREFERRED EMBODIMENTS

The embodiments of the present invention will now be described in detail, with reference to the accompanying drawings.

Figure 1:
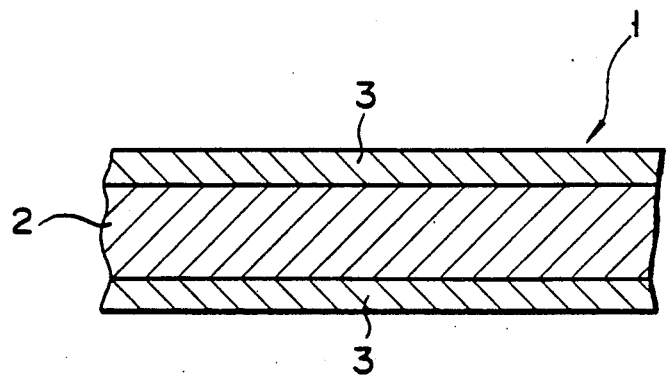
FIG. 1 is a cross-sectional view of an insert according to the present invention.
Figure 2:
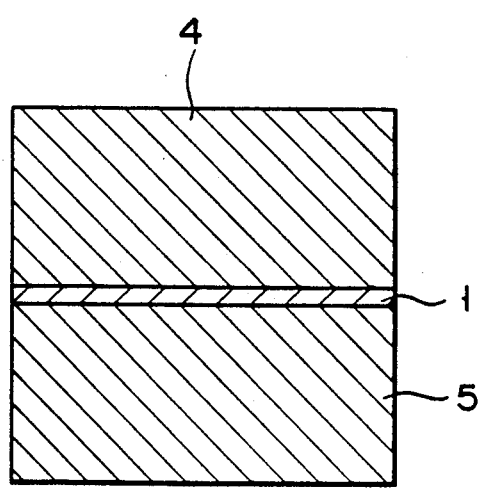
FIG. 2 is a cross-sectional view of two base metal bodies joined by the insert of FIG. 1 interposed between the base metals.

FIG. 1 is a cross-sectional view of insert 1 according to a first embodiment of the invention. FIG. 2 shows two base metal bodies 4 and 5 joined by insert 1 interposed between them. As is shown in FIG. 1, insert 1 comprises thin substrate 2 made by cold-rolling, and two bonding alloy layers 3 formed by plating on the upper and lower surfaces of substrate 2, respectively. Both layers 3 are extremely thin, and are made of an alloy having a melting point lower than that of substrate 2. Insert 1 is used to achieve liquid phase diffusion bonding of first and second base metal bodies 4 and 5. More precisely, insert 1 is interposed between first base metal body 4 and second base metal body 5. Then, insert 1 and base metal bodies 4 and 5 are clamped together with a pressure of, for example, 0.5 kgf/mm$^2$, and are placed in a atmosphere of a low pressure of about $10^{-4}$ Torr and heated to the melting point of alloy layers 3 or to a temperature above this melting point but below the melting points of substrate and base metal bodies 4 and 5. Hence, neither the substrate nor base metal bodies melt or are deformed. As the heating proceeds, the atoms of alloy layers 3 diffuse into base metals 4 and 5. When layers 3 cease to exist at all, base metal bodies 4 and 5 are firmly bonded by substrate 2.

The base metal bodies 4 and 5 can each be made of an elemental metal or an alloy. Substrate 2 is made of a material selected from the group consisting of Fe, Ni, Cu, Ti, a Fe-based alloy, a Ni-based alloy, a Cu-based alloy and a Ti-based alloy. Of these materials, the most workable, strongest after working, and most ductile is cold-rolled into a foil. Since substrate 2 is made of such material, the bonding of base metal bodies 4 and 5 can be sufficiently strong even if substrate 2 remains between the base metals 4 and 5. When substrate 2 is as mechanically strong as, or mechanically stronger than, base metal bodies 4 and 5, the combined structure made up of substrate 2 and base metals 4 and 5 does not break at substrate 2 when a tensile stress is applied on this structure. This also ensures a sufficiently firm bonding of the base metal bodies. Further, when substrate 2 is as strong as, or stronger than base metal bodies 4 and 5, insert 1 can be strong enough to be interposed between base metal bodies 4 and 5 without being broken. There will arise no practical problem even if bonding alloy layers 3 are not so strong mechanically.

It is desirable that substrate 2 be 5 to 500 μm thick, for some reasons. First, it is difficult to manufacture a foil having a thickness less than 5 μm. Secondly, such a thin foil, even if obtained, is hard to handle. Thirdly, if substrate 2 has a thickness over 500 μm, insert 2 will be too thick to successfully accomplish liquid phase diffusion bonding of base metals whose joining surfaces are uneven. It is more desirable that substrate 2 be 5 to 300 μm. This is because substrate 2, if having a thickness within this range, can be more easily manufacture and handled. As described above, substrate 2 is made by cold rolling. Hence, it has smooth surfaces, and its surface regions are formed of small crystals. Therefore, the atoms of both metal layers 3 can easily diffuse into substrate 2.

No conventional inserts for liquid phase diffusion bonding comprise a substrate. Hence, when two base metal bodies are bonded by using any conventional insert, atoms of one base metal, which may adversely affect the crystal structure of the other base metal, can diffuse into the other base metal. This undesirable phenomenon does not occur when the insert of this invention is used since the insert comprises substrate 2 whose composition and thickness have been adjusted.

Bonding alloy layers 3 are made of a Ni-P alloy, an Ni-B alloy, a Ni-Si alloy, a Ni-Si-B alloy, a Cu-Mn-Ni alloy, a Cu-Zn alloy, a Ag-Ti-Cu alloy or a Cu-Ti alloy. All these alloys have relatively low melting points, ranging from 800° to 1140° C., and can thus easily achieve liquid phase diffusion bonding. In other words, the atoms of these alloy can easily diffuse into substrate 2 and base metal of the bodies 4 and 5. Since bonding alloy layers 3 are formed on both major surfaces of substrate 2 by plating, they can be extremely thin. Their thickness is preferably 5 to 120 μm. If their thickness is less than 5 μm, layers 3 fail to fasten base metal bodies 4 and 5 at the entire joining surfaces thereof since base metal bodies 4 and 5 have a surface roughness of about 5 μm. Conversely, if the thickness of layers 3 is over 120 μm, it takes a long time for the atoms of layers 3 to diffuse into substrate 2 and base metal bodies 4 and 5, thereby reducing the efficiency of liquid phase diffusion bonding. More preferable thickness of bonding alloy layers 3 is 5 to 60 μm. Still more preferable thickness is 5 to 20 μm. The liquid phase diffusion bonding can be accomplished in a relatively short time if bonding alloy layers 3 have a thickness falling within any of these ranges.

It is desirable that a difference between the melting point of alloy layers 3 and that of base metal of the bodies 4 and 5 be at least 200° C. It is also preferable that a difference between the melting point of substrate 2 and that of layers 3 be at least 100° C. Otherwise substrate 2 and base metal bodies 4 and 5 would be deformed in some cases when they are heated to a temperature higher than the melting point of layers 3.

When base metal bodies 4 and 5 are made of the same material (e.g., carbon steel), it would be advisable that both bonding alloy layers 3 be made of this material. In this case, both layers 3 can be simultaneously formed by electroplating on the both major surfaces of substrate 2. Since base metals 4 and 5 are made of the same material, insert 1 can serves to firmly join base metal bodies 4 and 5.

On the other hand, when base metals 4 and 5 are made of different materials, alloy layers 3 of different materials which can well be bonded respectively to the materials of base metal bodies 4 and 5, respectively, are formed on the major surfaces of substrate 2. In this case, too, layers 3 can serve to strongly bond base metal bodies 4 and 5. Therefore, the insert of this invention can bond two base metal bodies made of different materials, strongly unlike the conventional inserts for liquid phase diffusion bonding.

Figure 3:
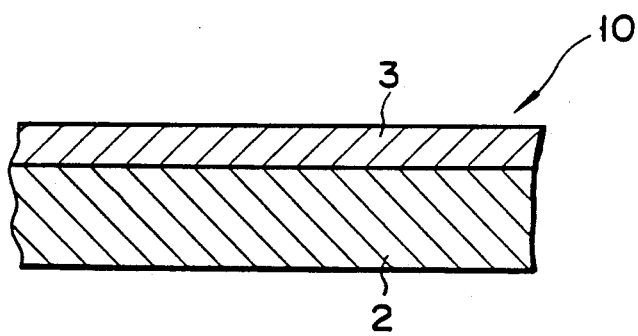
FIG. 3 is a cross-sectional view of another insert according to the invention.
Figure 4:
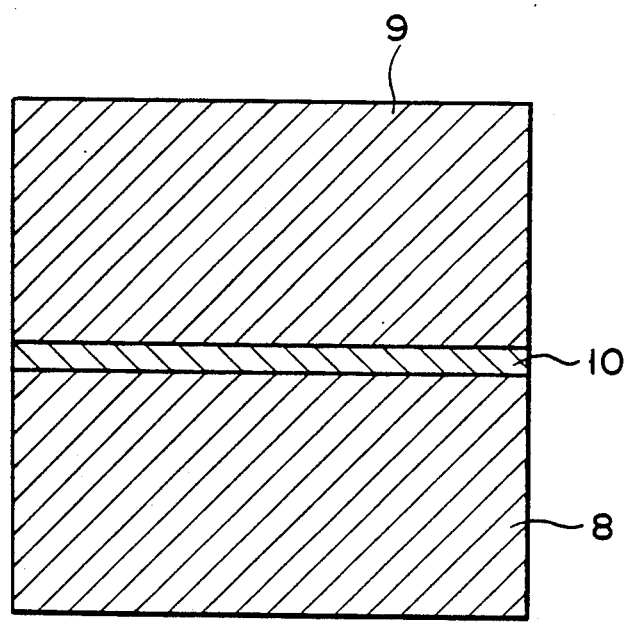
FIG. 4 is a cross-sectional view of two base metal bodies joined by the insert of FIG. 3 interposed between the base metal bodies.

FIG. 3 is a cross-sectional view of insert 10 according to a second embodiment of the invention. FIG. 3 shows two base metals 8 and 9 joined by insert 10 interposed between them. As is shown in FIG. 1, insert 10 comprises thin substrate 2 made by cold-rolling, and one bonding alloy layer 3 formed by plating on one surface of substrate 2. This insert 10 can be used when base metal bodies 8 and 9 are made of, for example, stainless steel and carbon steel, respectively. Substrate 2 is made of carbon steel.

Layer 3 is formed on the lower surface of substrate 2, so as to contact base metal 8. Since substrate 2 and base metal body 9 are made of the same material, they can be join by direct diffusion bonding. Base metal 8 and substrate 2, which are made of different materials, are readily bonded by means of liquid phase diffusion bonding, as the atoms of alloy layer 3 diffuse into substrate 2 and base metal body 8. Therefore, substrate 2 can strongly bond base metal bodies 8 and 9 together.

In either the first or the second embodiment, each bonding alloy layer 3 can be formed by various plating methods, such as electroplating, hot dipping, non-electrode plating, sputtering, vacuum plating and ion plating.

Several examples of the invention will now be described.

EXAMPLE 1

A Ni foil having a thickness of 100 μm was made by rolling. Two layers of Ni-11wt%P alloy, having a thickness of 20 μm, were formed on the both surfaces of the Ni foil, respectively, by the known electroplating process. Thus was obtained an insert. This insert was interposed between two plates of Fe-18wt%Cr-18wt%Ni alloy. The two base metal plates and the insert were placed within a furnace filled with Ar gas. They are then heated at 1000° C. for one hour, while a pressure of 1 kgf/mm$^2$ was being applied on the insert by pressing both plates onto the insert. As a result, a combined structure was obtained. It was observed that the atoms of Ni-11wt% P alloy had diffused into the Ni foil and both base plates, uniformly over the entire joining interface of the foil and plates. The combined structure was put to a tensile strength test. It was broken, not at the joining interface of the foil and base metal plates, but at a portion of one of the base metal plates.

EXAMPLE 2

A Ni foil having a thickness of 50 μm was made. Two layers of Ni-4.0wt%B alloy, having a thickness of 5 μm, were formed on the both surfaces of the Ni foil, respectively, by magnetron sputtering process, thus obtaining insert. The magnetron sputtering process was performed in a Ar gas atmosphere $10^{-5}$ Torr, by supplying a DC current of 500 to 1000 V to the Ni foil for 30 minutes. This insert was interposed between two block-like base metal bodies of Inconel 718 (an Ni-Cr-Fe alloy), each being 500 mm wide, 500 mm long, and 100 mm thick. The base metal bodies and the insert were placed within a furnace in which a reduced pressure of $10^{-4}$ Torr was maintained. They were then heated at 1150° C. for 30 minutes, while a pressure of 0.5 kgf/mm$^2$ was being applied on the insert by pressing both base blocks onto the insert. As a result, a combined structure was obtained. It was observed that both base metal bodies were as firmly bonded as the plate-like base metal pieces were in Example 1. The combined structure was put to a tensile strength test. It was broken, not at a joining interface of the foil and one of the base metal bodies, but at a portion of one of the base metal blocks.

EXAMPLE 3

An Inconel 713C foil having a thickness of 100 μm was made. Two layers of Ni-7.0wt%Si-2.0wt%B alloy, having a thickness of 5 μm, were formed on the surfaces of the Inconel 713C foil, respectively, by magnetron sputtering process, thereby obtaining insert. The magnetron sputtering process was performed under the same conditions as in Example 2. This insert was interposed between two block-like base metal bodies of Inconel 713C, each being 500 mm wide, 500 mm long, and 200 mm thick. The base metal bodies and the insert were placed within a furnace in which a reduced pressure of $10^{-5}$ Torr was maintained. They are then heated at 1150° C. for 6 hours, while a pressure of 0.5 kgf/mm$^2$ was being applied on the insert by pressing both base metal blocks onto the insert. As a result, a combined structure was obtained. It was observed that the joining interface of both blocks had the same crystal structure of any other portions of the base metals.

EXAMPLE 4

A Cu foil having a thickness of 50 μm was made by rolling. One layer of Cu-35wt%Mn-9.0wt%Ni alloy, having a thickness of 20 μm, were formed on one surface of the Cu foil by the known hot dipping process, thus obtaining an insert. The insert was interposed between two base metal plates which were a Cu plate and a carbon steel plate, respectively, with the layer of Cu-35wt%Mn-9.0wt%Ni alloy contacting the carbon steel plate. The base metal plates and the insert were placed within a furnace in which a reduced pressure of $10^{-5}$ Torr was maintained. They were then heated at 1000° C. for 30 minutes, while a pressure of 0.5 kgf/mm$^2$ was being applied on the insert by pressing both base metals onto the insert. As a result, a combined structure was obtained. It was observed that the base metal plates were as firmly bonded together as in Example 1. The combined structure was put to a tensile strength test. It was broken, not at a joining interface of the foil and a base metal plate, but in a portion of one of the base metal plates.

EXAMPLE 5

A Cu foil having a thickness of 50 μm was made by rolling. A layer of Cu-32.5wt%Zn alloy and another layer of Ni-11wt%P alloy, both having a thickness of 20 μm, were formed on two surfaces of the Cu foil, respectively, by the known electroplating process. Thus an insert was obtained. The insert was interposed between two base metal plates which were a Cu plate and a carbon steel plate, respectively with the Cu-32.5wt%Zn alloy layer contacting the Cu plate, and with the Ni-11wt%P alloy layer contacting the carbon steel plate. The base metals and the insert were placed within a furnace in which a reduced pressure of $10^{-5}$ Torr was maintained. They are then heated at 1000° C. for 30 minutes, while a pressure of 0.5 kgf/mm$^2$ was being applied on the insert by pressing both base metals onto the insert. As a result, a combined structure was obtained. It was observed that the base metal plates were as firmly bonded together as in Example 4. The combined structure was put to a tensile strength test. It was broken, not at a joining interface of the foil and a base metal plate, but in a portion of the Cu base metal.

EXAMPLE 6

A Cu foil having a thickness of 300 μm was made by rolling. A layer of Ag-2wt%Ti-30wt%Cu alloy, having a thickness of 5 μm, was formed on one surface of the Cu foil by magnetron sputtering process under the same conditions as in Example 2. Further, another layer of Ni-11wt%P alloy, having a thickness of 10 μm, was formed on the other surface of the Cu foil, by the known non-electrode plating process. Thus was obtained an insert. The insert was interposed between two base metal plates which were a Ti plate and a carbon steel plate, respectively, with the Ag-2wt%Ti-30wt%Cu alloy layer contacting the Ti plate, and with the Ni-11wt%P alloy layer contacting the carbon steel plate. The base metal plates and the insert were placed within a furnace in which a reduced pressure of $10^{-5}$ Torr was maintained. They are then heated at 950° C. for 3 hours, while a pressure of 0.5 kgf/mm$^2$ was being applied on the insert by pressing both base metal plates onto the insert. As a result, a combined structure was obtained. It was observed that the base metal plates were as firmly bonded together as in Example 1. The combined structure was put to a tensile strength test. It was broken, not at a joining interface of the foil and a base metal plate, but in a portion of the Ti base metal plate.

EXAMPLE 7

A Ni foil having a thickness of 50 μm was made by rolling. Two layers of 72wt%Cu-28wt%Ti alloy, having a thickness of 5 μm, were formed on the two major surfaces of the Ni foil, respectively, by magnetron sputtering process the same conditions as in Example 2, thus obtaining an insert. The insert was interposed between two base metal plates which are a Ti plate and a carbon steel plate. The base metal plates and the insert were placed within a furnace in which a reduced pressure of $10^{-5}$ Torr was maintained. They are then heated at 950° C. for 3 hours, while a pressure of 0.5 kgf/mm$^2$ was being applied on the insert by pressing both base metal plates onto the insert. As a result, a combined structure was obtained. It was observed that the base metal plates were as firmly bonded together as in Example 6. The combined structure was put to a tensile strength test. It was broken, not at a joining interface of the foil and a base metal plate, but in a portion of the Ti base metal.

The present invention is not limited to the embodiments described above. A variety of changes or modifications can be made without departing from the spirit and scope of the invention.

What is claimed is:

1. A method of liquid phase diffusion bonding of two base metal bodies, each made of a metal or alloy material, using an insert, said method comprising the steps of:

forming bonding alloy layers having a melting point lower than that of the materials of said base metal bodies on both major surfaces of a thin substrate made of a material selected from the group consisting of Fe, Ni, Cu, Ti, a Fe-based alloy, a Ni-based alloy, a Cu-based alloy and a Ti-based alloy, differing in metal or alloy base from both of said materials of said base metal bodies by plating of said bonding alloy layers on said substrate to produce said insert, said bonding alloys being selected for respectively having atoms diffusible by heat into the respective materials of said first and second base metal bodies;

inserting said insert between said base metal bodies; and heating said base metal bodies and said insert while held together to a temperature not lower than the melting point of said bonding alloy layers and lower than melting points of said materials of said base metal bodies and said substrate to diffuse the atoms of said substrate and said base metal bodies, thereby joining said base metal bodies, said substrate having a thickness not exceeding 500 μm and being sufficiently thick for material thereof to remain thereafter as a layer joining said base metal bodies.

2. A method according to claim 1, wherein said substrate has a thickness of 40 to 500 μm.

3. A method according to claim 1, wherein said substrate has a thickness of 50 to 500 μm.

4. A method of liquid phase diffusion bonding of first and second base metal bodies, each made of a material which is a metal or an alloy which is different from that of the other, using an insert comprising a thin substrate of a material which is the same as that of said first base metal body or a material containing an element which is the main component of said first base metal body, said method comprising the steps of:

forming a layer of a bonding alloy having a melting point lower than those of the respective materials of said substrate and second base metal body by plating said bonding alloy on a major surface of said substrate, said substrate material being selected from the group consisting of Fe, Ni, Cu, Ti, a Fe-based alloy, a Ni-based alloy, a Cu-based alloy and a Ti-based alloy, said substrate and said bonding alloy layer constituting said insert, said bonding alloy being selected for containing atoms diffusible by heat into said substrate and into said second base metal body;

inserting said insert between said first and second base metal bodies so that said bonding alloy layer faces towards said second base metal body; and heating said base metal bodies and said insert while held together to a temperature not lower than the melting point of said bonding alloy layer and lower than the melting point of the materials of said base metal bodies and substrate to diffuse atoms of said bonding layer into said substrate and into said second base metal body for liquid diffusion bonding and to diffuse the atoms of said substrate into said first base metal body for direct solid diffusion bonding, thereby joining said base metal bodies.

5. A method according to claim 4, wherein said substrate has a thickness of 40 to 500 μm.

6. A method according to claim 4, wherein said substrate has a thickness of 50 to 500 μm.

7. A method of liquid phase diffusion bonding of two base metal bodies respectively having surfaces to be joined which are of the same configuration, said configuration having no gaps enclosed by the perimeter of the surface, each said body being made of a metal or alloy material, said method using an insert and comprising the steps of:

forming bonding alloy layers, each having a melting point lower than that of the materials of said base metal bodies, respectively on both major surfaces of a thin substrate made of a material selected from the group consisting of Fe, Ni, Cu, Ti, a Fe-based alloy, a Ni-based alloy, a Cu-based alloy and a Ti-based alloy by plating of said bonding alloy layers on said substrate to produce said insert, said substrate and insert having at least a major portion which is of the same configuration as said base metal body surfaces to be joined, said bonding alloy layers each being made of a material selected from the group consisting of a Ni-P alloy, an Ni-B alloy, an Ni-Si alloy, an Ni-Si-B alloy, a Cu-Mn-Ni alloy, a Cu-Zn alloy, an Ag-Ti-Cu alloy, and a Cu-Ti alloy;

inserting said portion of said insert between and into contact with said surfaces of said base metal bodies; and heating said base metal bodies and said insert, while they are held together, to a temperature not lower than the temperature at which both of said bonding alloy layers melt and lower than melting points of said materials of said base metal bodies and said substrate to diffuse the atoms of said substrate and said base metal bodies, thereby joining said base metal bodies, said substrate having a thickness not exceeding 500 μm and being sufficiently thick for material thereof to remain thereafter as a layer joining said base metal bodies.

8. A method of liquid phase diffusion bonding of two base metal bodies respectively having surfaces to be joined which are of the same configuration, said configuration having no gaps enclosed by the perimeter of the surface, each said body being made of a metal or alloy material, said method using an insert and comprising the steps of:

forming bonding alloy layers, each having a melting point lower than that of the materials of said base metal bodies, respectively on both major surfaces of a thin substrate made of a material selected from the group consisting of Fe, Ni, Cu, Ti, a Fe-based alloy, a Ni-based alloy, a Cu-based alloy and a Ti-based alloy, said substrate having at least a major portion of the same configuration as said base metal body surfaces to be joined and said alloy layers being made by plating of said bonding alloy layers on said substrate to produce said insert, the melting points of the respective bonding alloy layers being in the range of 800 to 1140° C.;

inserting said portion of said insert between and into contact with said surfaces of said base metal bodies; and heating said base metal bodies and said insert, while they are held together, to a temperature not lower than the lowest temperature at which both of said bonding alloy layers melt and lower than the melting points of said materials of said base metal bodies and said substrate, to diffuse the atoms of said substrate and said base metal bodies, thereby joining said base metal bodies, said substrate having a thickness not exceeding 500 μm and being sufficiently thick for material thereof to remain thereafter as a layer joining said base metal bodies.

9. A method of liquid phase diffusion bonding of two base metal bodies respectively having surfaces to be joined which are of the same configuration, said configuration having no gaps enclosed by the perimeter of the surface, each said body being made of a metal or alloy material, said method using an insert and comprising the steps of:

forming bonding alloy layers, each having a melting point lower than that of the materials of said base metal bodies, respectively on both major surfaces of a thin substrate having at least a major portion of the same configuration as said base metal body surfaces to be joined and made of a material selected from the group consisting of Fe, Ni, Cu, Ti, a Fe-based alloy, a Ni-based alloy, a Cu-based alloy and a Ti-based alloy and differing in metal or alloy base from both of said materials of said base metal bodies, said layers being made by plating of said bonding alloy layers on said substrate to produce said insert, inserting said portion of said insert between and into contact with said surfaces of said base metal bodies; and heating said base metal bodies and said insert while they are held together to a temperature not lower than the lowest temperature at which both of said bonding alloy layers melt and lower than the melting points of said materials of said base metal bodies and said substrate, to diffuse the atoms of said substrate and said base metal bodies, thereby joining said base metal bodies, said substrate having a thickness not exceeding 500 μm and being sufficiently thick for material thereof to remain thereafter as a layer joining said base metal bodies.

10. A method of liquid phase diffusion bonding of two base metal bodies respectively having surfaces to be joined which are of the same configuration, said configuration having no gaps enclosed by the perimeter of the surface, each said body being made of a metal or alloy material, said method using an insert and comprising the steps of:

forming bonding alloy layers, each having a melting point lower than that of the materials of said base metal bodies, respectively on both major surfaces of a thin substrate having at least a major portion of the same configuration as said base metal body surfaces to be joined and made of a material selected from the group consisting of Fe, Ni, Cu, Ti, a Fe-based alloy, a Ni-based alloy, a Cu-based alloy and a Ti-based alloy, said layers being formed by plating of said bonding alloy layers on said substrate to produce said insert, said bonding alloys being selected for respectively having atoms diffusible by heat into the respective materials of said first and second base metal bodies;

inserting said portion of said insert between and into contact with said surfaces of said base metal bodies; and heating said base metal bodies and said insert while they are held together to a temperature not lower than the lowest temperature at which both of said bonding alloy layers melt and lower than the melting points of said materials of said base metal bodies and said substrate, to diffuse the atoms of said substrate and said base metal bodies, thereby joining said base metal bodies, said substrate having a thickness not exceeding 500 μm and being sufficiently thick for material thereof to remain thereafter as a layer joining said base metal bodies.

11. A method of liquid phase diffusion bonding of two base metal bodies respectively having surfaces to be joined which are of the same configuration, said configuration having no gaps enclosed by the perimeter of the surface, each said body being made of a metal or alloy material, said method using an insert and comprising the steps of:

forming bonding alloy layers, each having a melting point lower than that of the materials of said base metal bodies, respectively on both major surfaces of a thin substrate having at least a major portion of the same configuration as said base metal body surfaces to be joined and made of a material selected from the group consisting of Fe, Ni, Cu, Ti, a Fe-based alloy, a Ni-based alloy, a Cu-based alloy and a Ti-based alloy, said layers being formed by plating of said bonding alloy layers on said substrate to produce said insert;

inserting said portion of said insert between and into contact with said surfaces of said base metal bodies to hold them together with a pressure lower than 1.0 kgf/mm$^2$; and heating said base metal bodies and said insert while held together at said pressure to a temperature not lower than the lowest temperature at which both of said bonding alloy layers melt and lower than the melting points of said materials of said base metal bodies and said substrate, to diffuse the atoms of said substrate and said base metal bodies, thereby joining said base metal bodies, said substrate having a thickness not exceeding 500 μm and being sufficiently thick for material thereof to remain thereafter as a layer joining said base metal bodies.

12. A method of liquid phase diffusion bonding of a first metal body made of a metal or alloy material and a second metal body made of another metal or alloy material, said first and second bodies respectively having surfaces to be joined which are of the same configuration, said configuration having no gaps enclosed by the perimeter of the surface, said method using an insert and comprising the steps of:

forming bonding alloy layers, each having a melting point lower than that of the materials of said base metal bodies, respectively on both major surfaces of a thin substrate having at least a major portion of the same configuration as said base metal body surfaces to be joined and made of a material selected from the group consisting of Fe, Ni, Cu, Ti, a Fe-based alloy, a Ni-based alloy, a Cu-based alloy and a Ti-based alloy, said layers being formed by plating of said bonding alloy layers on said substrate to produce said insert;

inserting said portion of said insert between and into contact with said surfaces of base metal bodies; and heating said base metal bodies and said insert while held together at said pressure to a temperature not lower than the lowest temperature at which both of said bonding alloy layers melt and lower than the melting points of said materials of said base metal bodies and said substrate, to diffuse the atoms of said substrate and said base metal bodies, thereby joining said base metal bodies, said substrate having a thickness not exceeding 500 μm and being sufficiently thick for material thereof to remain thereafter as a layer joining said base metal bodies.

* * * * *